(12) United States Patent
Ricciardi

(10) Patent No.: US 6,951,020 B2
(45) Date of Patent: Sep. 27, 2005

(54) METHOD FOR HANDLING TRANSITIONS IN GROUPED SERVICES IN A DISTRIBUTED COMPUTING APPLICATION

(75) Inventor: Aleta Ricciardi, West Windsor, NJ (US)

(73) Assignee: Kayak Interactive Corporation, San Mateo, CA (US)

( * ) Notice: Subject to any disclaimer, the term of this patent is extended or adjusted under 35 U.S.C. 154(b) by 662 days.

(21) Appl. No.: 09/940,367

(22) Filed: Aug. 28, 2001

(65) Prior Publication Data

US 2003/0046440 A1 Mar. 6, 2003

(51) Int. Cl.[7] .................................................. G06F 9/46
(52) U.S. Cl. ...................... 719/314; 719/315; 719/330; 709/202
(58) Field of Search ............................... 719/315, 314, 719/330, 310, 317; 709/202

(56) References Cited

U.S. PATENT DOCUMENTS

| | | | | |
|---|---|---|---|---|
| 5,729,689 A | * | 3/1998 | Allard et al. ................. 709/228 |
| 5,754,854 A | * | 5/1998 | Kanamori et al. ........... 718/104 |
| 5,778,228 A | | 7/1998 | Wei | |
| 5,832,529 A | | 11/1998 | Wollrath et al. | |
| 5,903,725 A | * | 5/1999 | Colyer ......................... 709/203 |
| 6,018,805 A | * | 1/2000 | Ma et al. ........................ 714/4 |
| 6,065,039 A | * | 5/2000 | Paciorek ...................... 709/202 |
| 6,175,876 B1 | * | 1/2001 | Branson et al. ............. 709/252 |
| 6,185,611 B1 | | 2/2001 | Waldo et al. | |
| 6,212,565 B1 | | 4/2001 | Gupta | |
| 6,338,079 B1 | * | 1/2002 | Kanamori et al. ........... 718/104 |
| 6,360,273 B1 | * | 3/2002 | Beurket et al. .............. 709/244 |
| 6,571,277 B1 | * | 5/2003 | Daniels-Barnes et al. ... 709/213 |
| 6,665,705 B1 | * | 12/2003 | Daniels-Barnes et al. ... 709/203 |
| 2001/0037472 A1 | | 11/2001 | Li | |
| 2004/0158777 A1 | * | 8/2004 | Bae et al. ...................... 714/47 |

OTHER PUBLICATIONS

Farooqui, Kazi. Group–Based Distributed Computing, Programming & Distributed Platform Model. University of Ottawa. Feb. 2000.*

(Continued)

*Primary Examiner*—Lewis A. Bullock, Jr.
(74) *Attorney, Agent, or Firm*—Stuart D. Rudoler

(57) ABSTRACT

The invention is a method of handling groups of services where the makeup of the groups can be determined and changed while the application is running. This is mainly accomplished through a group proxy, which is generated at run time, and which handles interactions with groups of services on behalf of one or more clients. The group proxy consists of a group logic shell which contains all the group-aware logic, and a service proxy for each service in the group which contains the necessary logic to interact with the particular service. The group proxy, which is given to a client for all of its interactions with the group of services, buffers calls from that client to its group when the group is unavailable because it is in transition. When the transition is complete the group proxy transmits the stored client commands to the group.

12 Claims, 9 Drawing Sheets

OTHER PUBLICATIONS

Montresor, Alberto. "The Jgroup Reliable Distributed Object Model." Technical Report, Mar. 1999.

Montresor, Alberto. "A Reliable Registry for the Jgroup Distributed Object Model." Technical Report, Mar. 1999.

Weinreich, Rainer. "ObjectWire—Frameworks for Distributed Object–oriented Applications." Jun. 25, 1998.

Meyer et al. "Enabling Interworking between Heterogeneous Distributed Platforms." IEEE, 1996.

Felber, Pascal. "The Object Group Service: Concepts and Overview." Oct. 1998.

Jim Waldo, *The Jini Specification*, Book, 2001, 2nd Edition, Chapter LE.

Benchiao Jai et al.; *Effortless Software Interoperability with Jini Connection Technology*: Journal; Bell Labs Technical Journal; Apr. –Jun. 2000; pp. 88–101.

Ozalp Babaoglu, et al; *Partitionable Group Membership: Specification and Algorithms*, Journal; University of Bologna, Department of Computer Science; Technical Report; UBLCS–97–1

Alberto Montresor, et al.; *Enhancing Jini With Group Communications*; Journal; University of Bologna, Department of Computer Science; Technical Report, UBLCS–2000–16.

* cited by examiner

METHOD FOR HANDLING TRANSITIONS IN GROUPED SERVICES IN A DISTRIBUTED COMPUTING APPLICATION

BACKGROUND OF INVENTION

A distributed system is a collection of autonomous computing entities, hardware or software, connected by some communication medium. While often the computing entities are geographically dispersed, in some instances they might be separate processors in a multi-processor computer or even separate software routines executing in logically isolated memory space on the same computer. A computing entity need not be a traditional computer, but more generally can be any computing device, ranging from a large mainframe to a refrigerator or a cell phone. A distributed application is an application that executes on a distributed system and one in which parts of the application execute on distinct autonomous computing entities.

Whenever a distinct component of a distributed application requests something (e.g., a data value, a computation) of another component, the former is called a client and the latter is called a service. It is worth noting that the terms service and client are not exclusionary in that an item can be both a client and a service. For example, a routine that calculates the time between two events may be a client and of a clock service; if the clock service then calls a routine that converts to Daylight Savings Time, the clock becomes a client and the Daylight Savings Time converter is its service.

FIG. 1 shows a typical distributed application of the existing art. There are two clients 2, 4 and four services 10, 12, 14, 16 that the clients 2, 4 might need. Each service has a service proxy 10*a*, 12*a*, 14*a*, 16*a* which is a module of mobile code that can be used by clients to invoke that service. A service proxy 10*a*, 12*a*, 14*a*, 16*a* contains the code needed by a client 2, 4 to interact with a service. For instance if a service is a digital camera on a robotic arm, the interfaces might include Initialize( ), Zoom( ), Rotate( ) and Get_Picture( ). The service proxy 10*a*, 12*a*, 14*a*, 16*a* may also provide the expected return values for the service, which might include error codes as well.

Mobile code generally refers to a computer program that can be written on one platform and executed on numerous others, irrespective of differences in hardware, operating system, file system, and many other details of the execution environment. In addition to independence from the physical characteristics of the execution environment, a mobile program may move from one computer to another in the middle of its execution.

Mobile code may be pre-compiled, or compiled when it arrives at the execution platform. In the first case, numerous versions of the program must be written and compiled, then matched across run-time environments; this is mobile code in the letter, but not the spirit, of the definition. In addition, the same pre-compiled program cannot move from one platform to a different one during its execution. In the second, the program text may be distributed along with configuration scripts describing what to do in each execution environment. This distributes and delays the specificity of the pre-compiled option. The more interesting, and far more common approach exploits a standard virtual machine, which finesses all the issues of platform heterogeneity. The virtual machine is a program that itself mitigates the machine dependencies and idiosyncrasies, taking the raw program text and compiling it into binary executable.

In addition to clients 2, 4 and general services 10, 12, 14, 16, all distributed applications need some mechanism for clients 2, 4 to find services. Often such knowledge is assumed a priori, but many distributed applications use a look-up service 20. The look-up service 20 is a service with which the other services are registered or advertised to be available to for use by clients. In a simple system, where there is no attempt to coordinate replicas of services, each new service registers with the look-up service 20 (in the case of replicas, the onus falls on the client to resolve conflicts and ambiguity). When a service 10, 12, 14, 16 registers, it provides information telling clients 2, 4 how to find it. Commonly, this is a physical location such as an IP address and port number, but in the most modem systems this can be as powerful as giving the look-up service 20 a service proxy 10*a*, 12*a*, 14*a*, 16*a*, which is actual mobile code that clients 2, 4 can execute and use to invoke that service 10, 12, 14, 16. In this way, the service proxy 10*a*, 12*a*, 14*a*, 16*a* contains not just location information, but information for how to use the service 10, 12, 14, 16. While just as necessary for the client 2, 4 as location information, this has previously been assumed as a priori knowledge. When a client 2, 4 wishes to work with a service 10, 12, 14, 16 it finds it through the look-up service 20, downloads the service proxy 10*a*, 12*a*, 14*a*, 16*a* for that service 10, 12, 14, 16 from the look-up service 20, then uses the service proxy 10*a*, 12*a*, 14*a*, 16*a* to invoke the service 10, 12, 14, 16. The look-up service 20 may also have attributes of the services 10, 12, 14, 16, such as whether it is a grouped service, what type of group it is, what its cost to use is, how accurate it is, how reliable it is, or how long it takes to execute. In such cases the clients 2, 4 can use the attributes to decide which of a number of services 10, 12, 14, 16 it wishes to use.

Each of the foregoing has access to a communication network 22 so that it is capable of communicating with at least some of the other members in the distributed computing application. The communication network 22 may be wireless, a local area network, an internal computer bus, a wide area network such as the Internet, a corporate intranet or extranet, a virtual private network, any other communication medium or any combination of the foregoing.

In the prior art example shown in FIG. 1, one client 2 is a traffic monitoring program that notifies a user when and where traffic has occurred and the other client 4 is an automated toll collection program. The services are a clock 10, a road sensor 12 that monitors traffic flow on a highway, a toll booth sensor 14 that detects an ID device in each car that passes through the toll, and a credit card charge program 16. When each service 10, 12, 14, 16 becomes available to the application it registers with the look-up service 20 and provides the look-up service with its service proxy 10*a*, 12*a*, 14*a*, 16*a*.

When the traffic monitoring client 2 begins, it queries the look-up service to see if a clock is available and what sensors are available. The look-up service 20 responds by providing the client 2 with the clock proxy 10*a*, the road sensor proxy 12*a* and the toll booth sensor proxy 14*a*. The traffic monitoring client 2 uses the service proxies 10*a*, 12*a*, 14*a* to invoke the clock 10 and the sensors 12, 14, and then to monitor traffic at various times of the day.

Similarly when the toll collector client 4 begins, it queries the look-up service 20 to see if a toll booth sensor 14 and a credit card charge service 16 are available. The look-up service 20 responds by providing the client 4 with the toll booth sensor proxy 14*a* and the credit card charge proxy 16*a*. The toll collector client 4 uses the service proxies 14*a*, 16*a*, to invoke the toll booth sensor 14 and the credit card charge program 16, and then to identify cars that pass through the toll booth and charge their credit cards for the toll.

A known feature of distributed applications is that services may be grouped. For instance there may be several services capable of performing the traffic sensor functionality. These can be grouped to form a logical notion of traffic sensor that is separate from the particular implementation of the sensors. This may be done for redundancy purposes in case one of the services fails, to provide parallel processing for computationally intensive tasks, to provide extra capacity for peak loads, as well as for many other reasons. Services in a group may communicate with each other to coordinate their activities and states. For instance in the example shown in FIG. 1 it may be advantageous to group the two sensors 12, 14.

There are two primary types of group structures: the coordinator cohort (CC) group and the peer group. In a CC group there is one distinguished member of the group, the coordinator, that processes requests from clients. The coordinator periodically updates the other services in the group, the cohorts, with information about its current state and completed requests, so that if the coordinator fails, the cohort selected to replace it will be as current as possible. The more frequent the updates, the more tightly coupled the states are between group members, and so the more likely the transition will occur without being visible to existing clients of the group. On the other hand, more frequent updates require additional computational capacity and communication bandwidth.

In a peer group, all of the members of the group process requests from a client, which itself requires some logic to decide how to use the multiple results returned from the group members. For example, if three thermometers exist in peer group, and a client requests the temperature it will receive three answers. Many options exist for using the multiple results, such as taking the first to respond, taking the average value of all the responses, or taking the highest value. A peer group is more robust and fault-tolerant than a CC group because each of the group members should always be in the correct state, and because the likelihood of the representative member (which is all members in a peer group, but only the coordinator in a CC group) being unavailable is drastically lower. However, a peer group also requires more resources, both bandwidth and computational, than a CC group because all of the group members are working and responding to each client request.

Another technique known in the existing art is leasing. A lease is an important concept throughout distributed computing, generally used between a client and service as a way for the service to indicate its availability to the client for a length of time. At the end of the lease, if the lease is not renewed, there is no guarantee of availability. In a simple example, a service may register with a look-up service and be granted a lease for five minutes. This means that the lookup service will make itself available to the service (i.e., list it) for five minutes. If a camera grants a lease to a client for two minutes, then that client will be able to position, zoom, and take pictures for two minutes. There are a wide variety of ways to handle lease negotiation, renewal and termination which are well known to those skilled in the art of distributed computing and all such methods are meant to be incorporated within the scope of the disclosed invention. A detailed explanation of leases can be found in, Jim Waldo, *The Jini Specification, 2nd Edition*, chapter LE (2001), which is incorporated herein by reference.

One useful aspect of leases is that they can be used for simple failure detection. If the expectation is that a client will continue to request lease renewal from a service, but then does not renew its lease, the service may assume that the client has failed, or is otherwise unavailable. This allows the service to more efficiently manage its own resources, by releasing any that were dedicated to expired clients. Such a use of leasing is described in U.S. Pat. No. 5,832,529 to Wollrath et al.

This is especially important because components only rarely plan and announce their failure and are not able to predict network outages. It is far more common that failures and outages are unexpected, and that the consequence is an inability to announce anything. In these cases, a client will not renew its lease so that eventually, the granting service will reallocate its resources. The shorter the lease period, the sooner a failure can be detected. The tradeoff is that both client and service spend proportionately more time and resources dealing with leasing and that timing anomalies may have implications for correctness.

Some benefits of distributed computing and mobile code can immediately be seen from this example. First, the clients 2, 4 in FIG. 1 do not need to know ahead of time which sensors 12, 14 are available, or even how many. They simply query the look-up service 20, which provides this information along with the necessary mobile code 12a, 14a to call the sensors. Similarly, the clients 2, 4 do not care which clock 10 is available, as long as any clock 10 is available. Again, this is because through the use of mobile code, a client 2, 4 is provided with the necessary service proxy 10a to invoke and work with the clock 10. Also, the failure or unavailability of a single sensor 12, 14 or other service is not likely to cause the entire application to stop running. Further, the processing load is distributed among a number of computing devices. Also, the various computing entities need not use the same operating system, so long as they conform to a common interface standard.

Jini is one example of a commercially available specification for a distributed object infrastructure (or middleware) for more easily writing, executing and managing object-oriented distributed applications. Jini was developed by Sun Microsystems and is based on the Java programming language; consequently, objects in a Jini system are mobile. Jini is described in Jim Waldo, *The Jini Specification, 2nd Edition* (2001). The Common Object Request Broker Architecture (CORBA), developed by the Object Management Group, and Distributed Component Object Module (DCOM), developed Microsoft Corporation, are two other commercially available examples that are well known in the prior art. Jini, DCOM, CORBA and a number of other distributed computing specifications are described by Benchiao Jai et al., *Effortless Software Interoperability with Jini Connection Technology*, Bell Labs Technical Journal, April–June 2000, pp. 88–101, which is hereby incorporated by reference.

Distributed computing systems with groups can also be found in the prior art, particularly in the academic literature. For example, Ozalp Babaoglu et al., *Partitionable Group Membership: Specification and Algorithms*, University of Bologna, Department of Computer Science, Technical Report UBLCS-97-1 describe groups, but assumes the services in the group are group-aware. Similarly static group proxies, or software wrappers, for clients have been described in Alberto Montresor et al., *Enhancing Jini with Group Communication*, University of Bologna, Department of Computer Science, Technical Report UBLCS-2000-16, but these group proxies cannot be modified during execution of the distributed application to accommodate changes in group make-up and structure.

A number of problems can be found in these and other implementations and putative descriptions of distributed applications. Chief among these is that, even if some notion of groups is available within the infrastructure, both services and clients need to be group-aware; that is they need to contain logic to interact either within and as part of a group (in the case of grouped services), or with a group (in the case of clients of a group of services). This logic is very complex and the skill set required to write such software is very different from the skills required to write the underlying client or service. Further, many existing clients and services exist that do not have group logic, and even for clients and services that are being newly written it can be challenging to write this logic as part of the module. Even if group logic is coded into new clients or services, they become locked into a particular instance and type of group and in most cases will need to be rewritten if the group architecture or makeup changes. Therefore it is desirable to develop a methodology wherein the group-aware logic for clients and services are provided in separate code modules. Existing and previously described attempts at group services have always assumed that both the services to be grouped and the clients using group services are group-aware. The assumption of group-awareness prevents existing, or legacy, software from being able to take advantage of the benefits of groups (unless they are rewritten) and burdens new applications with providing the necessary group logic to operate with the particular implementation of the group service. If wrappers were considered for grouping legacy services, they were static and hard-coded, locking the service into a single framework. Moreover, static wrappers introduce an additional, distinct point in the computation, with negative performance and, ironically, fault tolerance implications, since such solutions can never operate in the same process space. In all frameworks, group structures were static and therefore did not permit transitions between group structures.

All previous frameworks also ignored clients. Further, even if clients are written to be group-aware, they must be group-aware in the very particular way that the group of services are implemented. For example, if a client is capable of delaying its requests during membership changes to a group of services, until it receives a signal informing it that the membership change has completed, then it cannot interact with a system in which groups send no such signal, but instead expect the client to poll for this information. Therefore it would be preferable for this logic to be provided at run time when the groups are established.

A major problem with current distributed computing methodologies that support groups is that changes to the group's membership are invasive; that is, services within a group cannot be changed without temporarily halting the availability of the application. Further, in current systems, if a service, whether grouped or single, is unavailable, the client is burdened with handling this unavailability; if it does not, the client may wait indefinitely, take incorrect steps, or even crash. This is true, even in simple redundant backup systems, where the client must handle any delays caused by the switch from a primary to a backup service. Another limitation of current approaches is that group structure, CC, peer or otherwise, is not modifiable without also stopping and then restarting the application, again leaving existing clients in the lurch. Fluid group structure transitions could be used to increase or decrease quality of service properties such as load-balancing or fault tolerance, and to simplify peer group operation when the service code calls for external interaction.

Thus, it is desirable to have a distributed application in which new services can be added, or services in a group restructured, "on the fly", that is without halting other members of the application.

It is therefore an object of this invention to provide a method for transparently managing and interacting with groups of services in a distributed application in which groups are dynamic in their membership, organizational structure, and their members' individual functionality.

It is a further object of this invention to provide a method of handling transitions in a group of services that does not burden the client.

It is a further object of this invention to provide a method for grouping services wherein a group of services can simultaneously be arranged in multiple group modes.

It is a further object of this invention to provide a method of grouping services in which the group-aware logic is provided in separate code modules from the core functional logic of the clients and services.

It is a further object of this invention to provide a method of grouping services in which the code modules that handle the group-aware logic are highly reusable from one application to the next.

It is a further object of the invention to provide for a method of grouping services where services can be added or removed, and groups restructured during operation, yet without interrupting, execution.

BRIEF DESCRIPTION OF THE INVENTION

The present invention is a method of handling a wide range of dynamic groups of services where the makeup of the groups can be determined and changed while the application is running. This is mainly accomplished through a group proxy, which is generated at run time, and which handles interactions with groups of services on behalf of one or more clients. The group proxy consists of a group logic shell which contains all the group-aware logic, and a service proxy for each service in the group which contains the necessary logic to interact with the particular service. The group proxy, which is given to a client for all of its interactions with the group of services, buffers calls from that client to its group when the group is unavailable because it is in transition. When the transition is complete the group proxy transmits the stored client commands to the group. In the preferred embodiment of the invention, all the group-aware logic for a distributed computing application is provided in separate code modules, namely the group proxy, group service and grouping agent, thus relieving clients and services from providing this logic and maintaining the purity of the look-up service and other infrastructure services.

DETAILED DESCRIPTION OF THE INVENTION

This invention is related to the invention described in the previously filed U.S. patent application, Ser. No. 09/028,026, still pending, Group Proxy and Method for Grouping Services in a Distributed Computing Application, filed on Aug. 10, 2001, which is hereby incorporated by reference.

Figure 1:
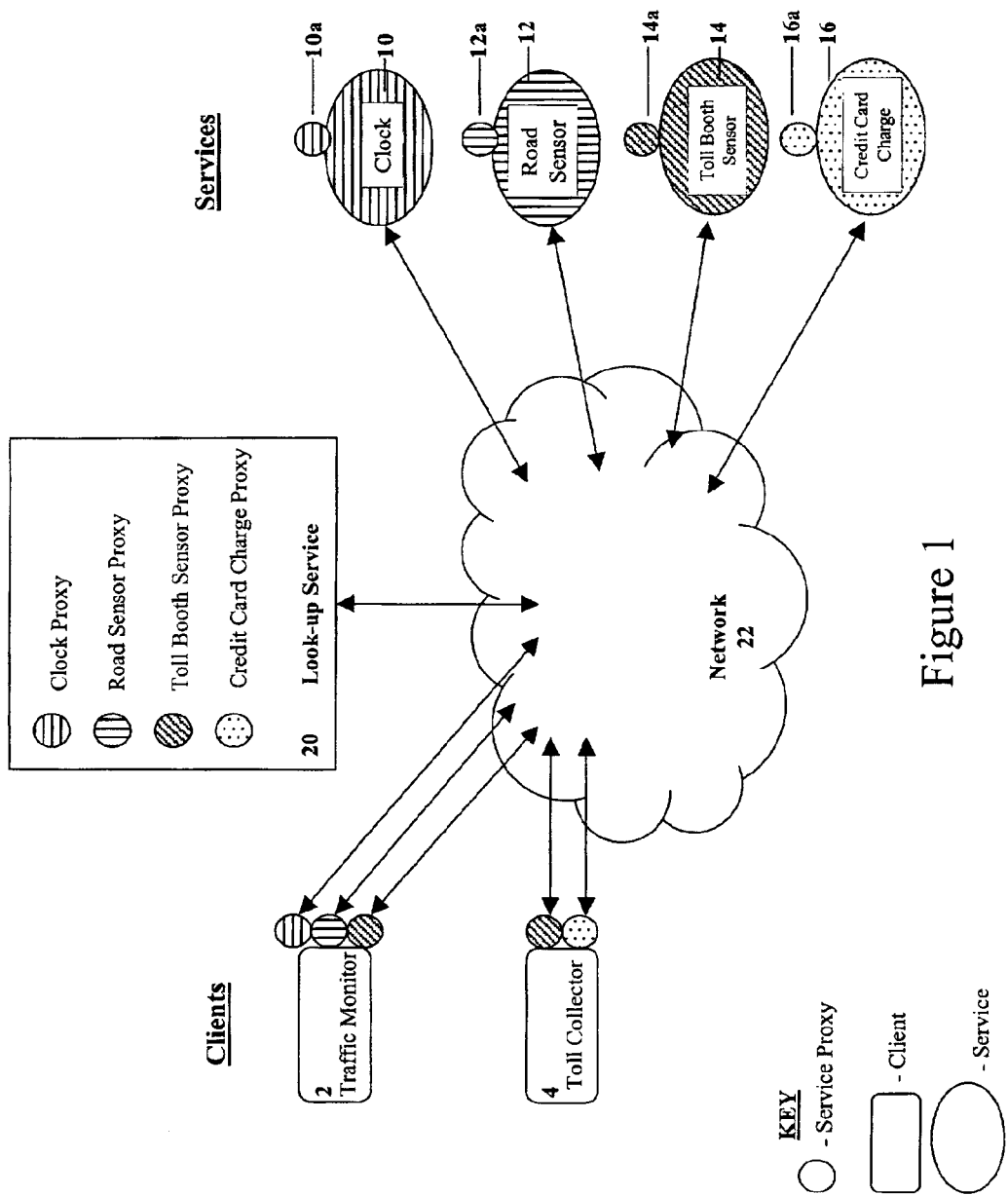
FIG. 1 shows an example of a distributed computing application of the prior art.
Figure 2:
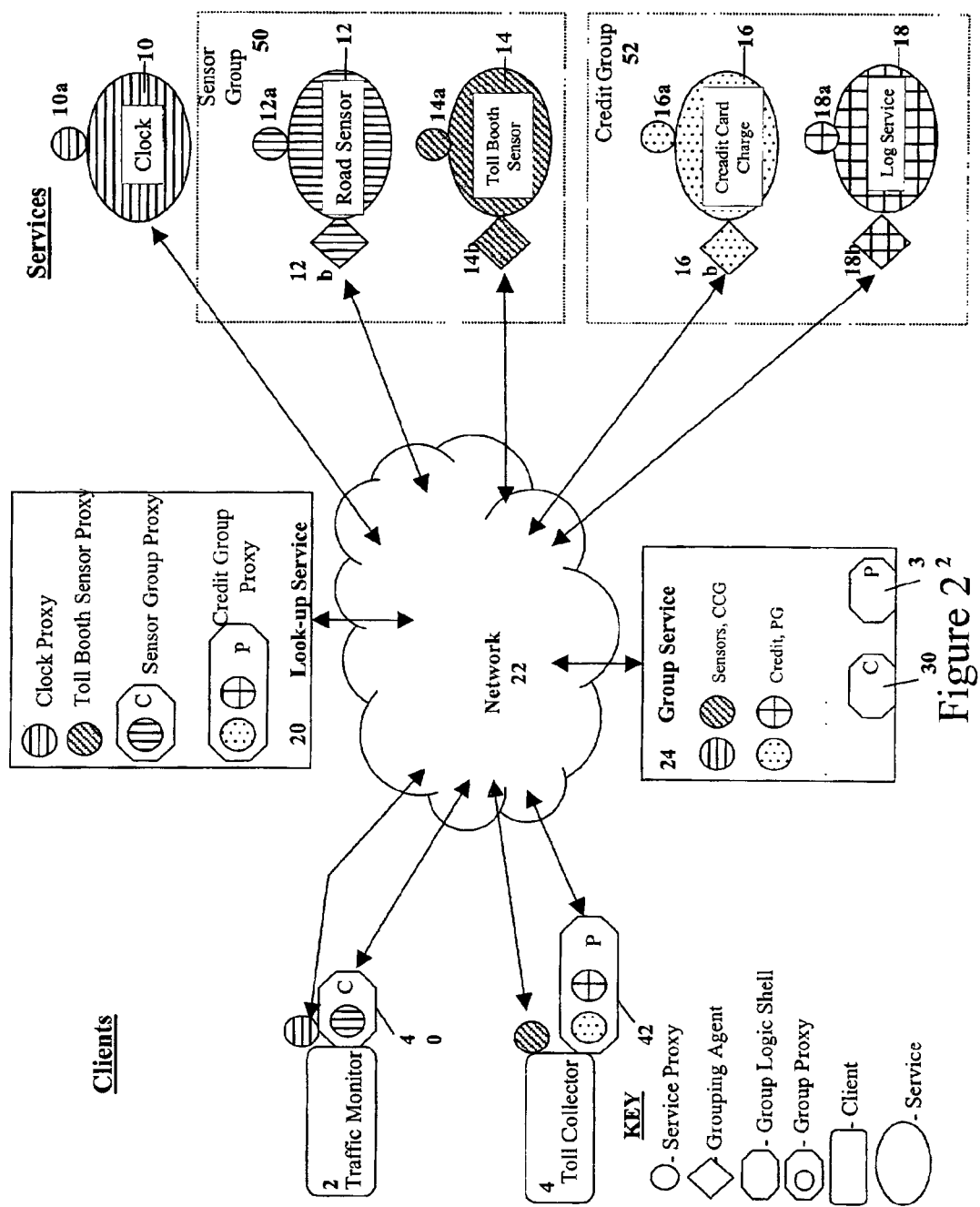
FIG. 2 shows an example of an improved distributed computing application of the current invention.

FIG. 2 shows an example of a distributed computing application of the current invention. As in FIG. 1 there is a communication network 22, a look-up service 20, a number of clients 2, 4, and a number of services 10, 12, 14, 16, 18, each of the latter having a service proxy 10a, 12a, 14a, 16a, 18a. In the current invention some of the services are grouped. In this example one group of services is a CC group 50 and the other group is a peer group 52. To support the group activity each grouped service is provided with a grouping agent 10b, 12b, 14b, 16b, 18b and there is a group service 24. In addition to there being proxies for each service there are also group proxies 40, 42, which act as proxies for each group.

The example shown in FIG. 2 provides specific clients services and groups, but the invention is generic in application and the example is not meant to limit the invention in any way.

Overview

Prior to describing the method for handling transitions it is helpful to understand the system on which the method is executed. While the detailed workings of the present embodiment of the invention will be described below, a general introduction is provided here using the example shown in FIG. 2. As in FIG. 1, the example of FIG. 2 is related to traffic monitoring and toll collection. An additional service, a log service 18, has been added which copies all information sent to it to some form of non-volatile memory. The log service 18 is essentially a recorder. The non-volatile memory might be a magnetic or optical medium, or even a paper print-out.

In this embodiment of the invention the road sensor 12 and the toll booth sensor 14 are grouped together in a CC group 50. As in FIG. 1 the traffic monitor client 2 makes calls to a clock 10, which is not grouped, and a sensor. However, in this example the sensor is grouped. From the point of view of the traffic monitor client 2, it does not need to know that the sensor is grouped, it simply calls a sensor service to get road traffic information, which in this case is a CC group 50. In the example the road sensor 12 is the coordinator and the toll booth sensor 14 is the cohort. If the road sensor 12 becomes unavailable, due to failure or any other reason, the toll booth sensor 14 will act as its backup and become the coordinator. The road sensor 12 might be designated as coordinator simply because it was the first to register with the group service 24, is more accurate, is more reliable, is less expensive or for any other reason.

The credit card charge service 16 and log service 18 are also grouped together, in this case as a peer group 52. Because they are grouped as a peer group, calls by any client to the credit group service 52 are executed by both the credit card charge service 16 and the log service 18. This is convenient in that a permanent record of charges is made by the log service 18 so that audits can be made to make sure that all credit charges executed by the credit charge service 16 were properly credited. In the event the credit card charge service 16 becomes unavailable, instead of failing, the credit group service 52, through the log service 18, at least creates a permanent record of charges, which can be retrieved later and processed.

Grouping Agent and Group Service

An improvement of the current invention is the use of grouping agents 12b, 14b, 16b, 18b, to handle the group-aware logic for the grouped services 12, 14, 16, 18. It is the grouping agent that intercept a registration call from a service to the look-up service 20 and directs the call to the group service 24. It is also the grouping agents 12b, 14b, 16b, 18b, that handles coordination between the services in a group. If a service belongs to more than one group, it might have multiple grouping agents.

While in a new service being written from scratch the grouping functions performed by the grouping agent can be written as an integrated part of the service, it is preferable that the grouping agent be written as a distinct code module from the core functions (i.e., addition and subtraction in a calculator). This allows 1) the grouping agent to be modified without affecting the core, 2) the core to operate with numerous different (or no) grouping agents simultaneously, 3) the grouping agent code to be used with a variety of different services, in most cases, with only minor modification, and 4) grouping agents to be switched on the fly. In services that are not group-aware, a grouping agent can be added to the existing core to make the legacy service group-aware.

The invention further provides for a novel group service 24 which performs a variety of functions that facilitate groups in the application. All of the services that wish to be grouped register their service proxies with the grouping service 24 instead of the look-up service 20. More accurately, a service's grouping agent registers its service proxy with the grouping service. However, for purposes of simplicity any group related activity described as taken by a service shall mean that the action is taken either by the service itself, if it is inherently group-aware, or by its grouping agent. The group service 24 then registers the appropriate service proxies with the lookup service 20. The group service 24 also coordinates whether each group will be a CC or peer group, and each such group's operation, transitions, and interactions. Most importantly the group service 24 dynamically creates the group proxies 40, 42 for each group by adding the appropriate service proxy (in the case of a CC group) or proxies (in the case of peer group) 10a, 12a, 14a, 16a, 18a to the appropriate group logic shell 30, 32, and then the group service 24 registers the group proxies 40, 42 with the look-up service 20 for use by the clients 2, 4. The group service 24 also coordinates the activities of the group proxies 40, 42 during fail-overs or other transitions and handles the updating of group proxies 40, 42 with the look-up service 20 and the various fielded (i.e. already attached to a client) group proxies 40, 42 when it is necessary to add, delete or switch the service proxies 10a, 12a, 14, 16a, 18a. The group service 24 also handles the swapping of group proxies 40, 42 if a group switches from CC mode to peer mode or vice versa.

Group Proxy

The group proxy 40, 42 represents another improvement of the current invention. Its task, as each grouping agent does for its service, is to handle all the group-aware logic for its client. It can be thought of as a device driver for a group of services. In addition, and of particular importance, a group proxy can buffer or redirect communication to and from a client when the group that client is calling is in transition. Such a transition may occur due to a failure of a service in a group, the addition or removal of a service in a group, changing of coordinators in a CC group, or a group switching between CC and peer mode. Since the group proxy provides an easily configurable software layer between the client and the rest of the distributed application it can also be used to perform other useful tasks such as copying commands to a test service, resolving the results of multiple responses from a peer group of services, or copying communication to a log service.

The group proxy 40, 42 is made up of a group logic shell 30, 32 and one or more service proxies 10a, 12a, 14a, 16a, 18a. The group logic shell 30, 32 contains all of the necessary group logic for a client to interact with a group of services. Assuming there is a defined interface (e.g. syntax) to call a service, the group logic shell 30, 32 contains this interface to present to clients 2, 4. The group logic shell 30, 32 contains the logic to intercept client 2, 4 commands to a group 50, 52, store them, and retransmit the commands at a later time. The group logic shell 30, 32 may also contain logic to copy or redirect client 2, 4 communication to other services. However, the group logic shell 30, 32 does not contain the necessary mechanisms, such as wire protocol implementation, to interact with the services 10, 12, 14, 16, 18 within a group. These are contained within the service proxies 10a, 12a, 14a, 16a, 18a. The group service 24 bundles the group logic shell 30, 32 with one or more service proxies 10a, 12a, 14a, 16a, 18a to form a group proxy 40, 42.

As shown in FIG. 2, there are separate group logic shells for a CC group 30 and for peer group 32. In fact, in the current embodiment there are two group logic shells for each group, one peer and one CC. Although a large portion of the group logic shell code is the same from group to group, each group has its own shells because the group logic shell has to present the identical interface to the client as any single member of the group would present. In an alternative embodiment, the group logic shells 30, 32 for each group stored within the group service 24 are identical, and when a group logic shell initializes it receives the necessary service interface from the grouping agents, or determines the appropriate interface using a process known as reflection. Reflection is well known to those skilled in the art of object-oriented computing and programming languages, and will not be elaborated upon here. Since storage space is generally inexpensive and the executable code for the group logic shells is not unduly large, in the shown embodiment the group service 24 stores a set of two group shells, peer 32 and CC 30, for each group.

In an alternative embodiment, the peer and CC group logic shells 32, 30 are combined into a single mobile code module and the group service 24 simply tells the group proxy in which mode to act. Such an architecture has certain advantages when it is desirable to transition groups between CC and peer mode during, yet without interrupting, execution, since it is not necessary to switch group proxies or logic shells at the clients, and therefore it is easier to ensure that no client commands are dropped in transition.

The use of a group logic shell to form a group proxy is an improvement of the current invention. It makes it possible to create and reconfigure group proxies on the fly as the application is running. It enables an architecture where, in most cases, only service proxies in the group proxy need to be updated as services are added and deleted from a group, instead of replacing the entire group proxy. Alternatively, logic shells may be changed, perhaps to switch between peer and CC modes, without replacing the service proxies.

FIG. 2 demonstrates another improvement of the current invention, namely that the same service can be simultaneously grouped and ungrouped with respect to different clients. In FIG. 2 the traffic monitor client 2 calls the sensor group 50 which includes the toll booth sensor 14. Simultaneously, the toll both sensor 14 is called directly by the toll collector client 4. The difference is that the toll collector client 4 uses the toll booth sensor service proxy 14a directly, while the traffic monitor client 2 uses the sensor group proxy 40. As shown the road sensor 12 is the coordinator of the sensor group 50 so that the sensor group proxy 40 attached to the traffic monitor client 2 is bundled with the road sensor service proxy 12a. Although not shown, if the toll booth sensor 14 becomes the coordinator for the sensor group 50, the group service 24 would swap the toll booth sensor service proxy 14a for the road sensor service proxy 12a in the sensor group proxy 40 at the traffic monitor client 2. Then both clients 2, 4 could use the toll both sensor 14 simultaneously, assuming it had enough processing power and bandwidth to serve both. Such a configuration may require a more sophisticated grouping agent that is able to differentiate between calls to the group and calls directly to the service. In such a scenario it is also beneficial that the client querying the look-up service be able to establish whether a particular service is grouped or ungrouped.

The group service manages the membership and structure of groups of services, is responsible for registering each group with the look-up service when its composition and structure are stable, and de-registering it when these are in transition. By way of an example, if there are three distinct services that have indicated (possibly through a grouping agent) a desire to form a particular group, the group service might determine that the instance with oldest time stamp be the representative provided to the look-up service; upon monitoring that instance the group service might later determine that some other instance (e.g., with the next oldest time stamp) should replace it and be registered with the look-up service. The group service also provides group proxies and is responsible for alerting clients through the group proxies of transitions within a group. The group service may also determine into which group structure the services are organized.

In the present embodiment of the invention it assumed that all group members expose and implement the same external interface. This makes all services in a group appear to be identical, even if they are not exact replicas. For example, a group of calculators may each perform addition, subtraction, multiplication and division. Regardless of whether the calculators were true identical replicas, as long as they implement the same interface they can easily be grouped in CC or peer group modes. In the likely event the actual programmer interfaces are not identical, a single interface must be decided on by the system architect, and the service proxy can implement the interface and its translation to the actual programmer interface. Consider that the Calculator group desires to provide a multiplication function, and consider that Calc-1 natively provides the interface Mult (float x, float y) and returns the result of x multiplied by y, while Calc-2 provides the interface multiply_by (float x, float y, float z) and returns the result of x multiplied by y in the variable z. The system architect may decide that the Calculator interface will have syntax Multiply (float x, float y) and provide the result of x multiplied by y. Then the service proxy for Calc-1 will implement Multiply (x, y) as Mult (x, y), while the service proxy for Calc-2 will implement Multiply (x, y) as multiply_by (x, y, z), having previously declared its own local variable z, and then return the value z. To further the example, suppose Calc-3 supports 64-bit precision, but Multiply (x, y) provides for only 16-bit precision; then the service proxy for Calc-3 will need to truncate 48 bits. If a member of the group cannot perform all the functions defined in the common interface, then the service proxy will need to compensate, either by completing the functionality, or by returning an exception (provided exceptions are defined in the common interface). For instance, suppose Calc-4 provides only for addition. Then its service proxy could implement font(x,y) as y additions of x to itself (for example: float result=0.0; for int i=1 to y, {result=add(x, result)}.

While in the preferred embodiment, the translations necessary to provide a common interface are handled by the service proxies, a similar function can be performed by the grouping agent for the service. Taking advantage of mobile code, another solution to this problem is to provide a special dedicated wrapper to the client or the service to handle this translation. Other solutions will be obvious to those skilled in the art, and are included within the scope of this invention. In an alternative embodiment services that do not present the same interface are grouped together.

Figure 3:
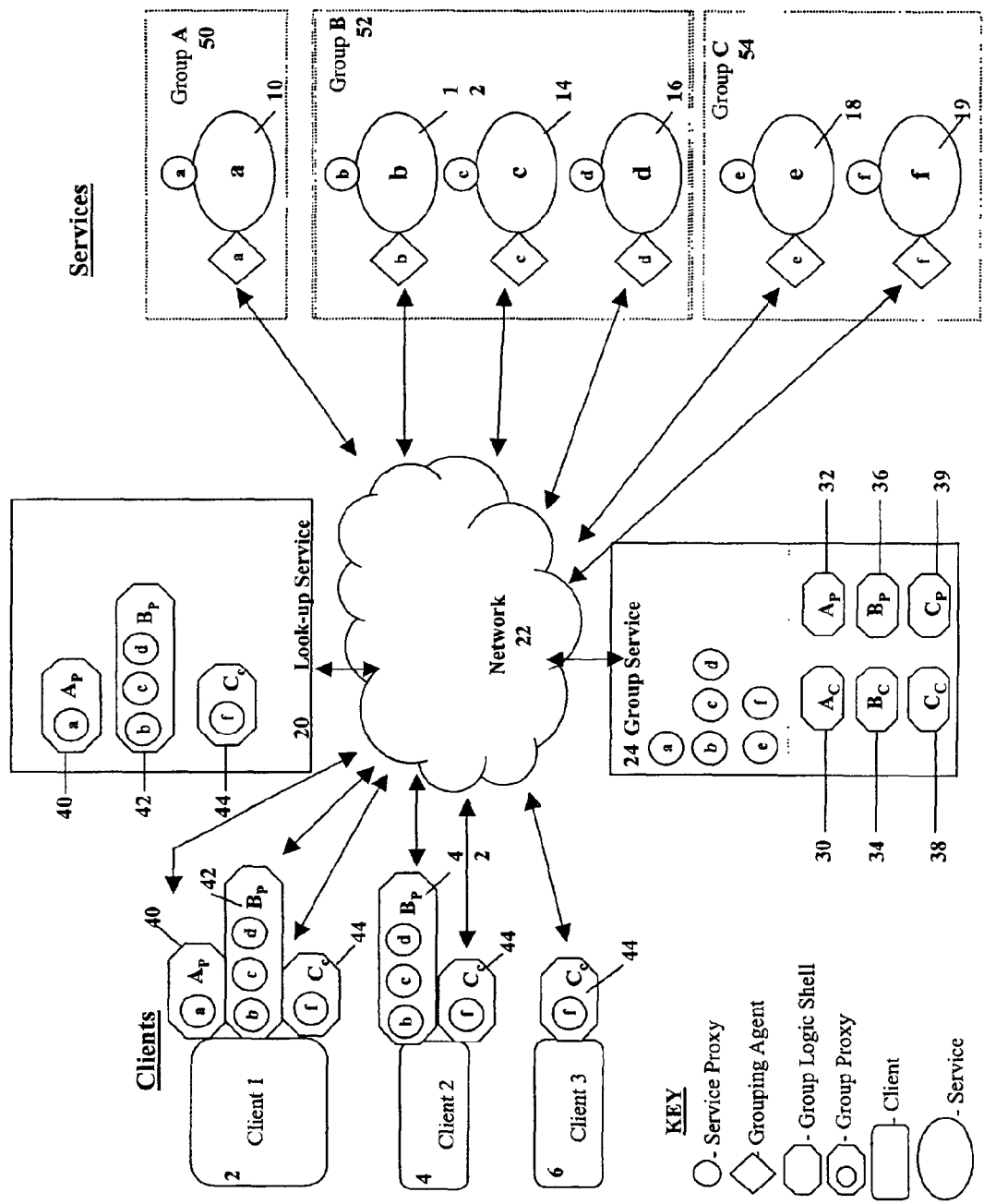
FIG. 3 shows a generic representation of the current invention.

The invention is not meant to be limited to the particular application or number of services, groups and clients shown in FIG. 2. FIG. 3 shows a generic implementation of the present invention in which there are three clients 2, 4, 6 and three different groups of services 50, 52, 54, although there need not always be an equal number of clients and groups. In this representation groups are represented in capital letters and services in small letters. For each group 50, 52, 54 the group service 24 has a CC group logic shell 30, 34, 38 (indicated by a subscript "c") and a peer group logic shell 32, 36, 39 (indicated by a subscript "p"). One point of this representation is to demonstrate that a client can call multiple groups, and a single group can be called by multiple clients, provided that each client 2, 4, 6 has the appropriate group proxy 40, 42, 44. For instance one client 2 calls all three groups: A 50, B 52, and C 54. Likewise, one group, C 54, is used by all three clients 2, 4, 6, and therefore each client has the group proxy 44 for that group. Also, in this representation there is a group, group A 50, consisting of only one service, thereby allowing the client of a single service to obtain some of the benefits of the group proxy, such as failure masking by buffering. In this embodiment, as presently shown, group A 50 and group B 52 are peer groups, and group C 54 is a CC group, although the structure of each group can be reconfigured.

While this description has principally referred to two types of group modes, peer and coordinator cohort, hybrids of these types, and other types of modes are possible, and the invention is meant to incorporate all such group modes, whether currently existing or invented hereafter. It has also been assumed herein that a grouping agent contains all the necessary logic to act in either CC or peer mode. However in an alternative embodiment, a service may have separate grouping agents for CC and peer modes. Likewise, although not optimal for reasons discussed above, a service could be written to incorporate the grouping agent functions, without having a separate group agent.

A group service is not necessary to gain the client-side benefits of command buffering using a group proxy. As described, the group service performs both failure detection and group management. In the absence of true groups, but given a mechanism for detecting failures, the "group" proxy could buffer requests upon being notified of a failure. Upon noticing that the service had been reestablished (for example, by periodically querying the look-up service) this group proxy would resume normal operation. This provides for less overall reliability (the existence of a group of replicas is proportionately more reliable), increased fail-over time (the length of service unavailability due to a failure) and increased latency (the length of time to complete a client's request), but still shields clients from the effects of service failures or transitions. In the preferred embodiment for implementing fault tolerance, the distributed system will implement physical replication of services (though they need not be identical replicas), and therefore will have a group service.

It is also possible, in an alternative embodiment, to combine the group service and lookup services into a single service. Likewise, in an alternative embodiment, the group logic shell, instead of being stored in the group service could be provided by the system designer ahead of time to each client that will need a particular group, and then the group service simply provides and updates the appropriate service proxies in those group logic shells. Such an architecture is less desirable in that it is less flexible, since it requires prior knowledge for each client, that it will use a group and which groups a service will be using.

The basic methodology for handling transitions within a group is for the group proxy to buffer commands while the group is in transition, to update or replace the group proxy so that it can work with the revised group, and then for the group proxy to transmit the commands it has buffered.

The remainder of the discussion will describe the particular methodology used to handle fail-overs and other transitions within a group. Both peer groups and CC groups are described. In the discussions that follows, a generic service will be called a Foo, which could be any functionality. A Foo could be a clock, a counter, a display driver, a traffic sensor, or a calculator. Further a reference to a service taking a particular action being taken by a service shall mean the service taking that action either directly, or, in the preferred embodiment, through its grouping agent.

Addition and Removal of Services from a Group

Figure 4:
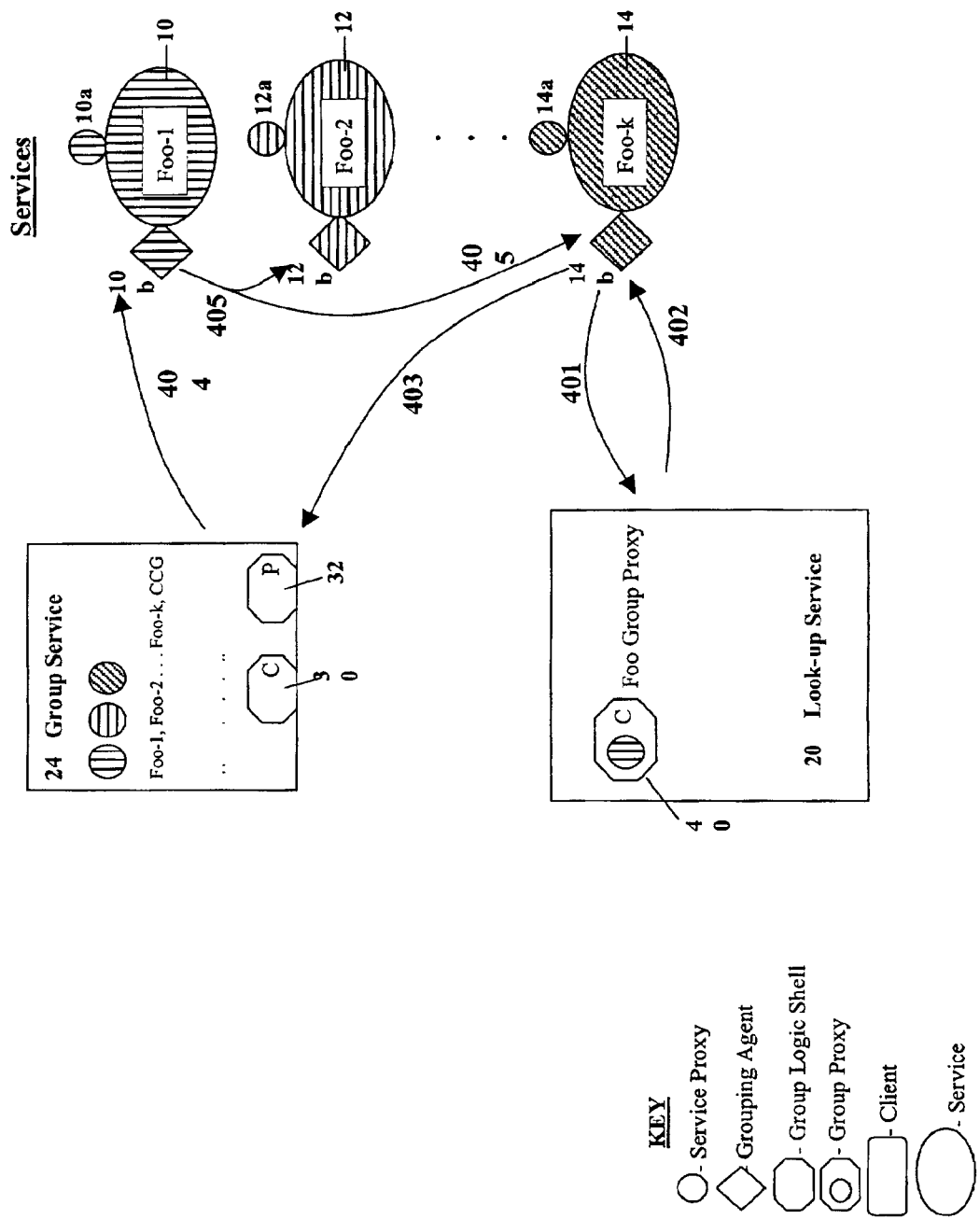
FIG. 4 shows a Foo service joining as the $k^{th}$ member of a coordinator cohort group.

FIG. 4 shows how another instance of a Foo service, Foo-k 14, joins an existing CC Foo group. In order to join a Foo group, Foo-k 14 (or its grouping agent 14b) queries the look-up service 20 to see if a group service is available 401. The group service 24 has already registered with the look-up service 20 and has given the look-up service 20 its own proxy (not shown). The look-up service 20 responds to Foo-k's (or its grouping agent's) request by providing it with the group service proxy 402. The Foo-k grouping agent 14b uses the group service proxy to invoke a method specifying a group name to join (in this case the Foo group), possibly the group structure it desires to participate in, and provides the Foo-k service proxy 14a to the group service 24, 403. Then, since there already is an established coordinator for the Foo group (assuming it is Foo-1), the group service 24 simply notifies the grouping agent 10b for the group coordinator 10 that there is a new member, or multiple new members, of the Foo group 404. The Foo-1 grouping agent 10b then begins to include the Foo-k grouping agent 14b in its periodic broadcasts to all the other Foos of its current group 405. In an alternate embodiment, the grouping agents would be initially designed to listen for relevant update events, so that updates can be done without requiring the coordinator to be aware of its cohorts' identities. Analogously, when a cohort Foo service, Foo-j fails or is removed from the group, in the current embodiment, the coordinator must be informed by the group service; in the anonymous embodiment it would not need to be. Removal of a Foo service from the Foo group, other than a coordinator, is similar to adding a Foo service. The Foo-j grouping agent notifies the group service 24 that Foo-j is leaving the service. The group service 24 deletes the Foo-j from the proxy list for the Foo group, and then instructs the coordinator's grouping agent that it no longer needs to include Foo-j in its periodic state updates. In the event that a Foo-j leaving is the coordinator, a new group coordinator must be designated. This process is similar to the fail-over in a CC group described below.

Figure 5:
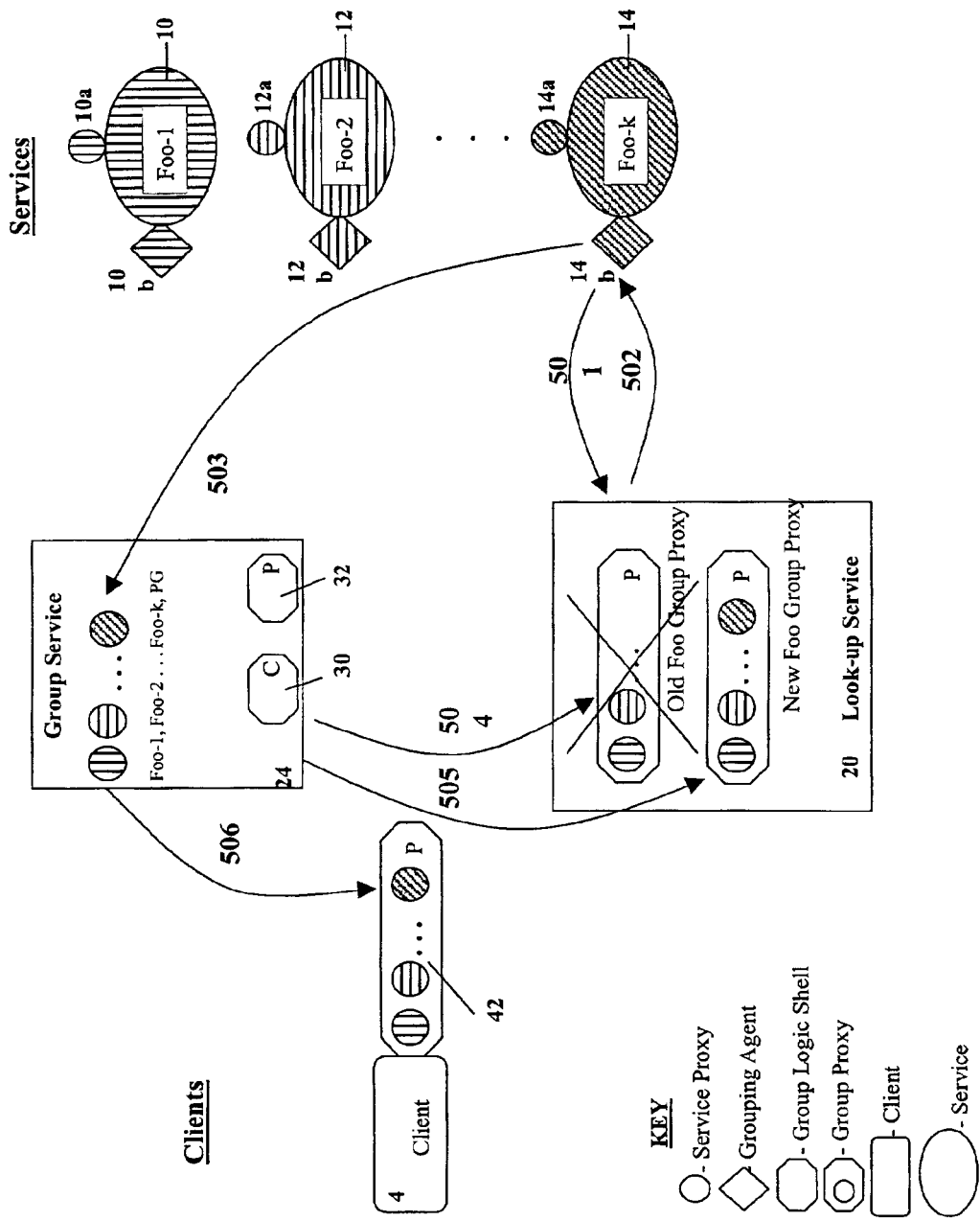
FIG. 5 shows a Foo service joining as the $k^{th}$ member of a peer group of Foos.

FIG. 5 shows how another instance of a Foo service, Foo-k 14, joins an existing peer Foo group. In order to join a Foo group, Foo-k 14 (or its grouping agent 14*a*) queries the look-up service 20 to see if a group service 24 is available 501. The group service 24 has already registered with the look-up service 20 and has given the look-up service 20 its own proxy (not shown). The look-up service 20 responds to Foo-k's 14 (or its grouping agent's 14*b*) request by providing it with the group service proxy 502. The Foo-k grouping agent 14*b* uses the group service proxy to invoke a method specifying a group name to join (in this case the Foo group), possibly the group structure it desires to participate in, and provides the Foo-k service proxy 14*a* to the group service 503. Continuing, the group service 24 deregisters Foo from the look-up service 20 so that outdated Foo proxies 10*a*, 12*a* are no longer distributed 504. The group service adds the Foo-k service proxy 14*a* to the existing set of proxies for Foo members, adding the Foo-k service proxy 14*a* to the peer Foo group logic shell 32, and re-registers Foo with the look-up service 20, 505. The group service 24 then distributes Foo-k's service proxy 14*a* to all fielded peer Foo group proxies (those already attached to clients), which add it to the bundle of other Foo member proxies already within the Foo group logic shell 506. Future client requests are therefore sent to Foo-k as well as all previous Foo group members. Steps 505 and 506 can be executed in either order or concurrently. The group service 24 might also instruct the group proxy for the clients to buffer commands until they receive the Foo-k proxy 42. However, in contrast with a CC group transition, there is generally no need for group proxies of peer groups to await further information about the peer group transition, so that there is no need for peer group proxies to buffer client commands.

To remove Foo-j from a peer Foo group, the group service 24 distributes instructions to the Foo peer group proxies 42 (already attached to clients 2) to remove the Foo-j service proxy from each of the Foo peer group logic shells 32. As in steps 504 and 505 above, the group service unregisters then re-registers Foo with the look-up service, and, as above, the group proxy 42 at the look-up service 20 and clients 2 can be updated in either order or concurrently.

Fail-overs

Figure 6:
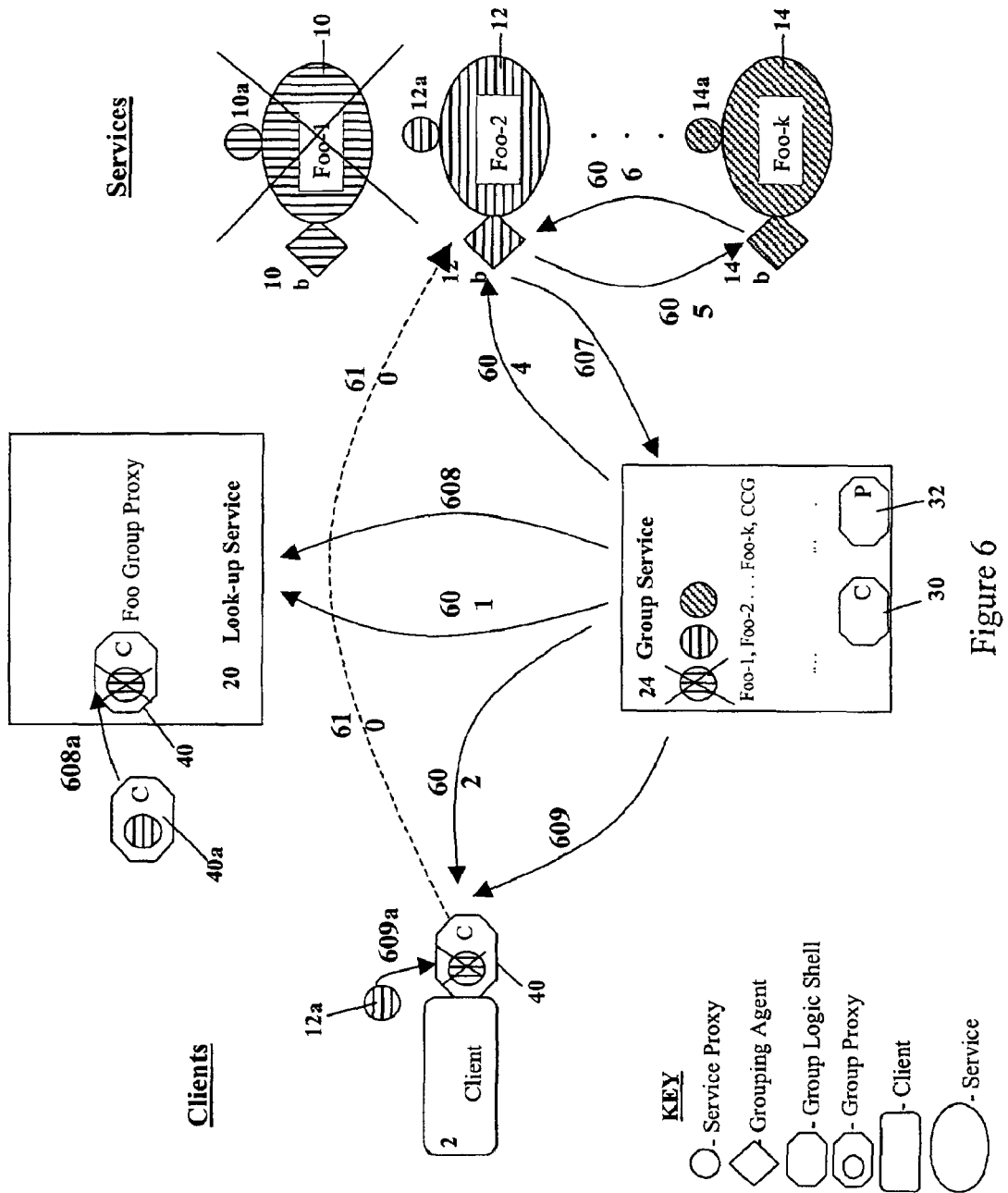
FIG. 6 shows a fail-over from Foo-1 to Foo-2 in a coordinator cohort group

FIG. 6 is a description of how the invention handles a fail-over in a CC group specifically, and transitions within a group generally. To begin, Foo-1 10 has a lease with the group service 24, where the group service 24 is the lease grantor and Foo-1 10 is the lease holder. The group service 24 has in turn negotiated a lease for the grouped Foo service with the look-up service 20. Foo-1 10 fails and therefore does not renew its lease with the group service 24. The group service 24 assumes that Foo-1 10 has not renewed its lease because it has failed. The group service 24 then cancels the Foo lease with the look-up service 20, 601 thereby temporarily preventing any new client from finding the Foo group. The group service 24 also announces (whether through multicast, broadcast, or individual event notification) to the group proxy 40 using the Foo service that Foo is unavailable 602. The announcement may also be heard by other interested members of the distributed application, such a log service that records errors or a beeper service that notifies a human operator. These decisions are left to the system designer, but may be implemented the same way.

In this example there is a single client 2, but there may be multiple clients using the Foo group, in which case each client would have an instance of the Foo group proxy 40 and would be notified and updated by the group service. Likewise, the Foo group proxy 40 for each client would buffer that client's commands during any transitions.

While in the described embodiment a service detects a client's unavailability through leasing, any other method of detecting unavailability can be used. For example, a dedicated failure detection service may be employed to actively and interactively monitor the status of all system components. Many methods for detecting unavailability, whether performed by each service or by a generic failure detection service, are known to those skilled in the art, and all such methods, as well as any others later invented, are included within the scope of this invention.

Similarly, while in the described embodiment the group service announces the notification of the Foo-1 10 failure, essentially combining the functions of failure detection, failure announcement and group organization, the system can be designed to separate these functions; specifically, a failure detection service could detect and announce failures to clients and to the group service, or it could pass detections on to an announcement service.

Continuing in FIG. 6, upon notification of the unavailability of Foo, the group proxy 40 begins to buffer commands to Foo from the client 2 it represents. The group service 24 then requests 604 that another Foo service, in this case Foo-2 12, become the coordinator of the group and synchronize its state with the remaining Foos 605, 606. The state synchronization is handled by the grouping agent 12*b*, 14*b* for each of the services 12, 14. Depending on the degree of assurance of synchronization required, this can be done anonymously through event notification (low degree of assurance) or explicitly through tightly-coupled individual method invocations (high degree of assurance). Foo-2 12 becomes the coordinator and then acknowledges the group service 24, 607. The group service 24 registers Foo-2 12 as the Foo service with the look-up service 20, 608, preferably by providing the look-up service 20 with a new Foo group proxy 40*a*, 608*a* containing the same group logic shell 30, but now with the Foo-2 service proxy 12*a*. Alternatively, if the look-up service 20 is capable of modifying registered proxies, the group service 24 can provide the look-up service 20 with the Foo-2 service proxy 12*a* to update the Foo group proxy 40 with (but leaving the existing group logic shell 30 in place). The group service 24 then distributes the Foo-2 service proxy 12*a* to the clients' group proxies (only one shown) 609. The group proxies 40 delete the Foo-1 service proxy 10*a* and add the Foo-2 service proxy 12*b*, 609*a*. The group service 24 then announces (not shown) to all the group proxies that the Foo service is again available. Note that steps 608 and 609 can be executed in either order or concurrently. Using the Foo-2 service proxy 12*a* the group proxy 40 directs the buffered commands to Foo-2 610. Once all buffered command have been sent, the client 2 commands can again be sent directly.

The handling of a failure of one of th services in a peer group is relatively trivial. The failure might be detected when failed Foo service does not renew its lease with the group service, or when the client's group proxy detects that a failed Foo did not provide a response to an invocation and then notifies the group service 24. The failed Foo's service proxy is simply removed from the peer group logic shells at the clients 2 and the look-up service 20 bundle as described above with respect to FIG. 8. In a peer group configuration, the transition period is much short than for a CC group, so buffering may not be needed.

As in the case of the CC groups, while the details of the peer group have been described with a single client, it is equally applicable to an application with multiple clients, where each client has a replica of one or more group proxies. The group service notifies and updates the group proxies at each of the clients and each group proxy buffers commands for the client it is attached to.

Swapping Services

In addition to group membership changes and fail-overs the group proxy can be used to handle other types of transitions. For instance, it may be desirable to swap one service for another on the fly, that is without stopping the application or the without stopping the clients that call those services. This is easily achieved, for peer or CC groups, with the current architecture. The group service instructs the relevant grouping agents to begin buffering clients' commands, and then deregisters the retiring service's group proxy from the look-up service. The retiring service's proxy is also removed from the group service. The replacement service registers with the group service to be a member of the group. The group service then updates the group proxies at the clients with the new service proxy, or an entirely new group proxy. The group service then registers the new group proxy with the lookup service. The group service then instructs the group proxies at the clients to again start processing commands, and the group proxies release their queue of buffered client commands to the replacement service. Alternatively, the replacement service can be added to the group of the retiring service first, and then the retiring service can be removed. On the fly swapping of services can also easily be accomplished even for a client that is ungrouped by treating it as a group of one.

The group proxy can also be used to test a new service that is being run in parallel with an existing service. The service to be tested is registered as part of the same group as the prime service. Commands from the client are transmitted from the group proxy to the prime service as well as the test service. In a peer group this is accomplished by broadcasting client commands to all members of the group. In a CC group it is accomplished by instructing the grouping agent for the coordinator (assuming the prime service is the coordinator) to effectively superimpose a peer group subset containing it and the service to be tested (or its grouping agent), though still operating in CC mode with the remainder of the cohorts. In either peer or CC mode, as responses are returned to the group proxy it compares results, performance, and so forth, from the service to be tested with the previously established services. Alternately, the group proxy can pass these results to a specialized benchmarking or evaluation program to perform these comparisons, or to a log service for later evaluation. It is also possible to have the grouping agent for the test service handle or discard the responses. Many other ways of performing comparison will be obvious to those skilled in the art and are incorporated within the scope of this invention.

It is also possible to test an ungrouped service (and even a service that is not group-aware) in parallel with a group of services by having all the group proxies that call the group copy their commands to the service being tested. Similarly, the group proxies can be used to copy and redirect client communications for other purposes such as recording commands to a log service or copying communication to a display monitored by a human. The latter use may be particularly useful when debugging new applications.

Switching Between CC and Peer Modes

As discussed above, many times a service to one client calls yet another service to perform a function, and in such instances the first service becomes a client of the second service. For services grouped in peer mode, it is often not desirable for the each service in the group to call the second service. This can result in overloading the second service, incorrect answers, delay, or excessive use of bandwidth. Some mechanism is required for the plurality of members of the peer group to send a single command when they are acting as a client. More generally, there are times when a peer group needs to organize itself internally as CC group, while still appearing to its own clients as a peer group.

Figure 7:
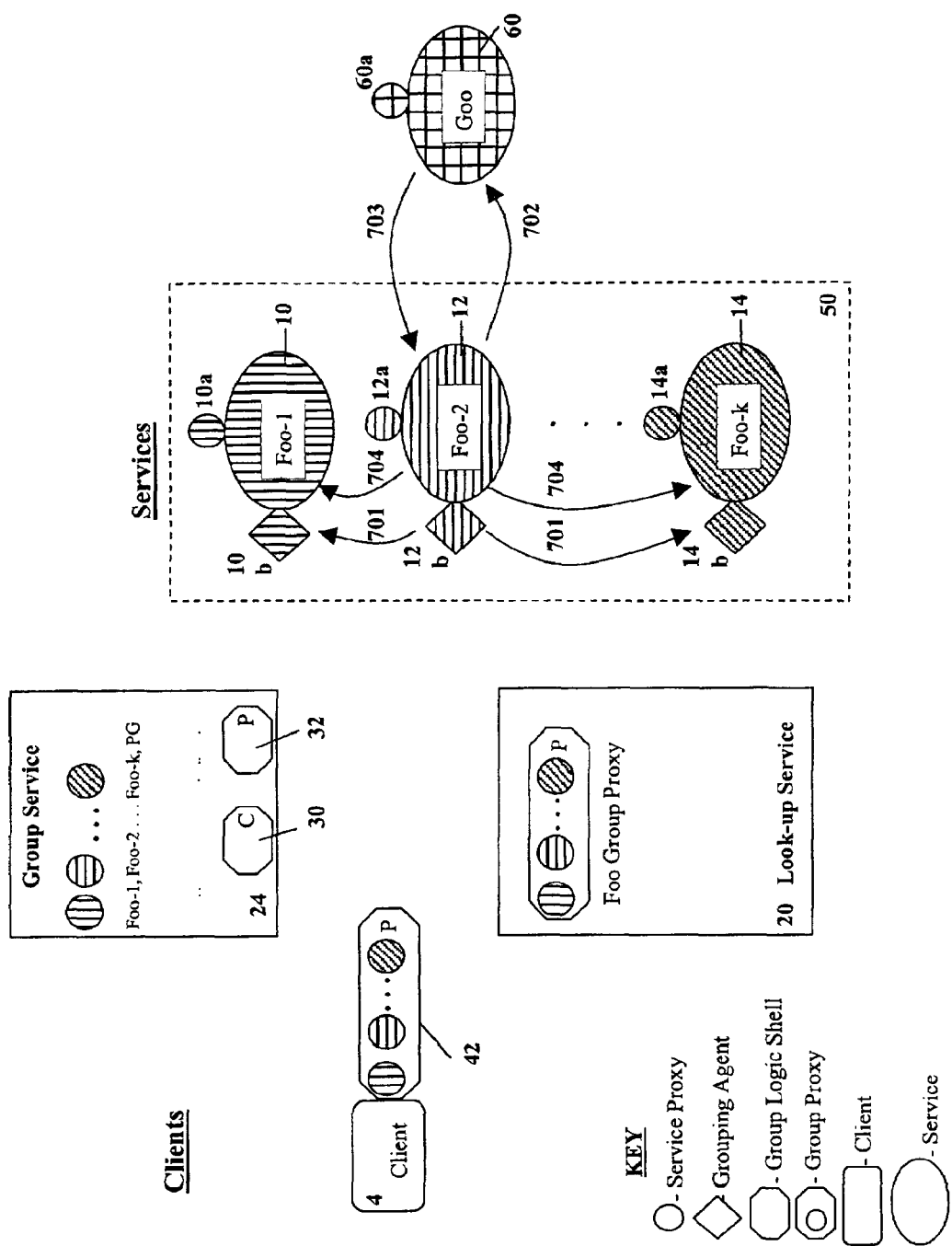
FIG. 7 shows a peer group of services reorganizing itself as a coordinator cohort group to call another service.

The present invention provides a mechanism for accomplishing such an internal reorganization as shown in FIG. 7. The peer group 50 switches to a CC group whenever its role switches from service to client; that is, from provider to requester. In effect, one group member assumes the role of coordinator client, while the remaining group members become cohort clients. In this case, the re-organization is purely internal to the peer group; it does not reflect any desire for the group to be perceived externally by its clients as a CC group. In FIG. 7 the Foo group 50 periodically needs to call another service, named Goo 60. When any member of the peer group is ready to issue such a command, in this example Foo-2 12, to the Goo service 60 it (or its grouping agent 12b) notifies the other members 10, 14 of the group 50 (or their grouping agents 10b, 14b) 701 which then buffer their own outgoing commands to the Goo service 60 until told otherwise. The coordinator 12 (or its grouping agent 12b) then makes the relevant invocation on the Goo service 60, 702. The Goo service 60 processes Foo-2's command and returns a response 703. When Foo-2 receives the response it distributes it to the cohorts 10, 14. The coordinator indicates that internal operation of the group can now resume in peer mode. If, during the time when the group 50 is in CC mode, it is desirable to prevent any of the Foo services 10, 12, 14 from executing any new commands from clients 4, then grouping agents 10b, 12b, 14b can buffer incoming commands. Alternatively, the Foo service that is acting as coordinator may, instruct the group proxy 42, either directly or preferably through the group service 24, to buffer client 4 commands.

In other cases, the transition between group modes, whether peer to CC or CC to peer, may be triggered by an external circumstance. For example, going from CC to peer may be occasioned by a policy-based need for increased fault tolerance, whereas going from peer to CC may be occasioned by clients accepting a lesser quality of service. An example of this might be the traffic monitoring system described in FIG. 2. During normal times it may be sufficient to operate in CC mode with the road sensor 12 as the coordinator and the toll booth sensor 14 as the cohort, especially if the traffic monitoring client 2 has to pay an extra fee to get data from the toll booth sensor 14. However, during rush hour the sensor group 50 might switch to peer mode to ensure greater accuracy of data and provide higher reliability.

In an alternative embodiment, the grouping agents can rely on the group service to assist in directing transitions from peer to CC or vice versa, but as long as the reorganization is purely ID internal the group service would not update the fielded group proxies or the group proxy being distributed by the lookup service.

In cases where the transition is explicit, that is the group not only reorganizes its structure, but intends to make itself available to clients in this new structure, the group service would be involved. In addition to directing the transitions of the services in the group, the group service would coordinate updating the fielded instances of the group proxy at clients and the lookup service.

Figure 8:
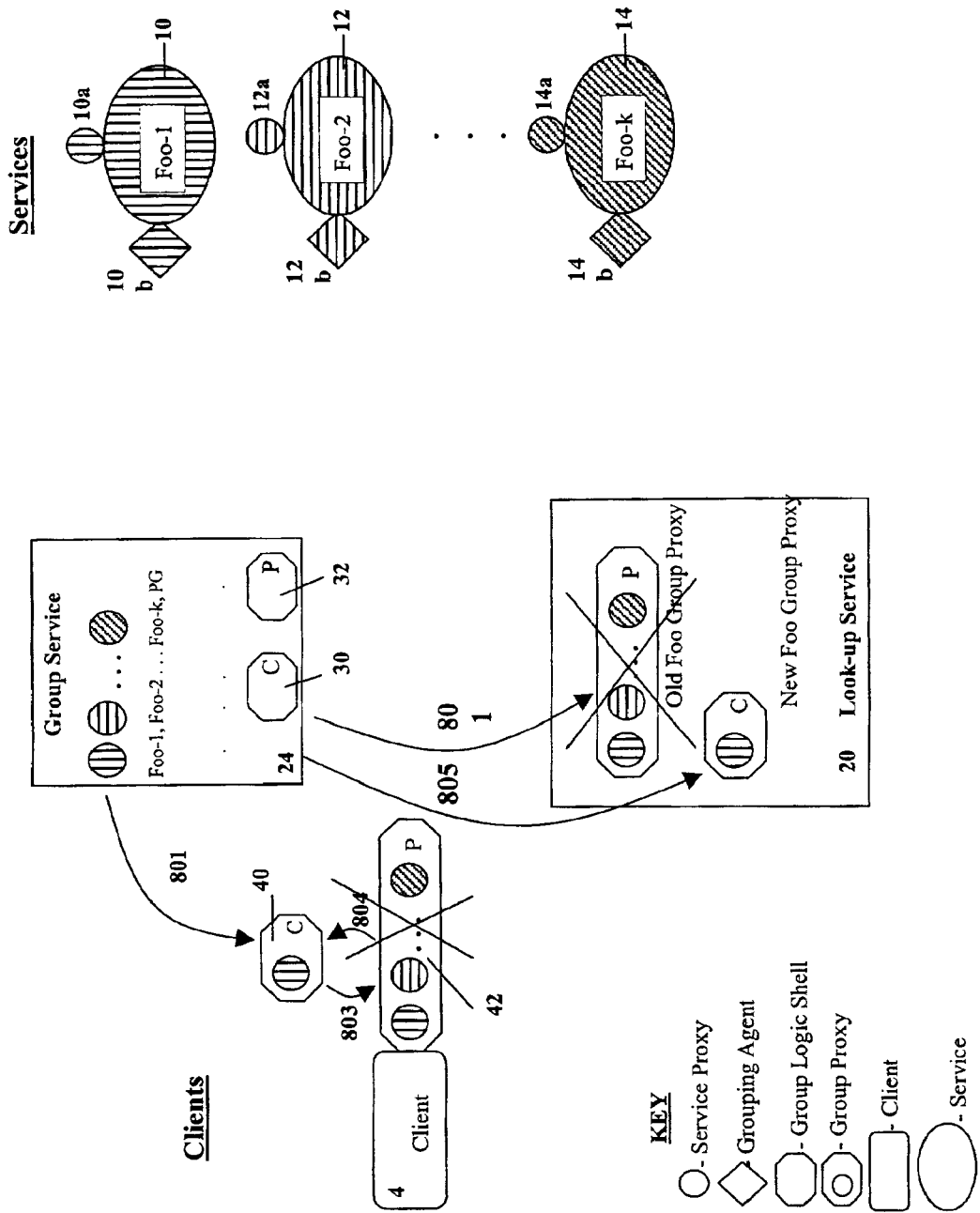
FIG. 8 shows a peer group reorganizing itself as a coordinator cohort group for use by clients.

An group mode reorganization from peer to CC mode is shown in FIG. 8 in which the change is recognized externally by clients. To begin, the group service 24 unregisters the group from the lookup service 20, 801. The group service 24 then creates a new group proxy 40, comprised of the appropriate group logic shell (CC 30 or peer 32) with the appropriate service proxies 10a, 12a, 14a bundled in it, and distributes the new group proxy 40 to the clients 4 to replace the old group proxy 42, 802. When the new group proxy 40 arrives at the client 4 it must handshake 803, 804 with the old group proxy 42 in order to be made aware of any outstanding requests, or any previously buffered commands from uncompleted membership transitions. Once this handshake has been completed, the new group proxy 40 can take over at that client 4 and the old group proxy 42 can be deleted from that client 4. The group service 24 then updates the lookup service 20 with a new group proxy 805, and then instructs the new group proxies 42 at the clients 4 to begin transmitting commands. While in FIG. 8 the transition is from peer to CC mode, a transition from CC mode to peer is substantially the same.

In the described embodiment, because there are different group logic shells for peer and CC modes, the group proxy is completely replaced when transitioning between modes. In an alternative embodiment a single group logic shell can contain the logic for both a CC group and a peer group. With a single group logic shell, in order to switch modes, the group service only has to update the service proxies bundled within group logic shell at the clients and look-up service. Specifically, in a switch from peer mode to CC mode, the group service would select one service and instruct it (or its grouping agent) to become the coordinator. The group service would then announce to all fielded group proxies that are distributed at clients that they should delete all of the service proxies except the coordinator's service proxy from the group logic shell. In a switch from CC mode to peer mode, the group service would add the necessary service proxies to the multiple instances of the group logic shells at the clients to form a new group proxy. In both cases, the group service would still unregister and reregister the group the look-up service to reflect the group's new incarnation. One advantage to this embodiment is that there is no need to handshake and pass buffered commands from one group proxy to another, since the same group proxy remains in place at each client.

In yet another alternative embodiment the group proxy could store all the service proxies for the group in whichever mode it was operating, and then the group service would not have to add and delete service proxies, but simply tell the group proxies at the clients which mode to act in and which proxies to use. In this embodiment service proxies would still be updated as services were added to and deleted from the group.

Dual Group Modes

Figure 9:
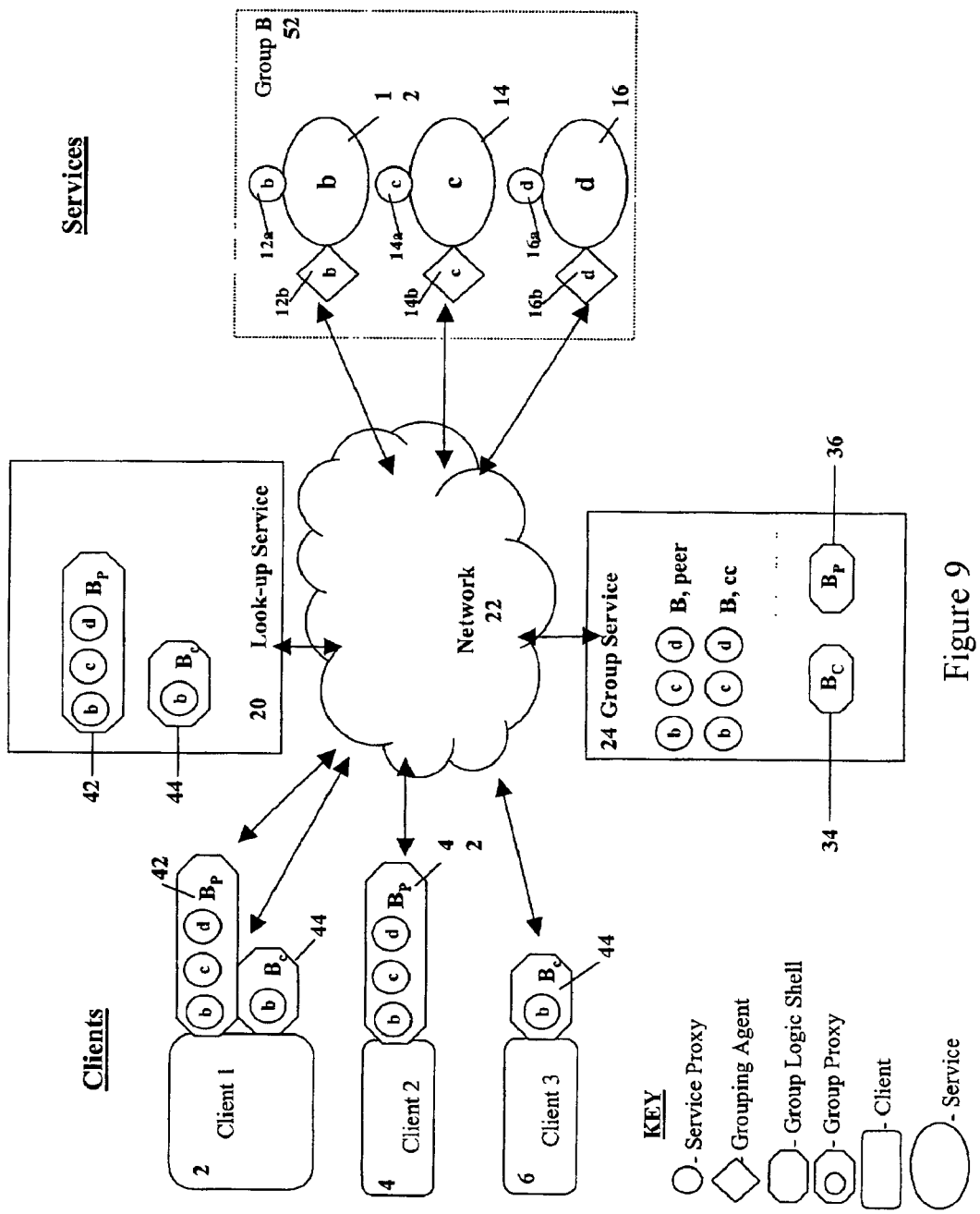
FIG. 9 shows an example of a group being in both peer and CC modes.

It is also possible for the same group to simultaneously be present in both peer and CC modes. The groups may have the identical set of members or only some members in common. Clients would determine which group mode they desired, for example based on price or quality of service offered, and be provided by the group service with the appropriate group proxy. FIG. 9 shows such a distributed system in which Group B 52 is used by Client 2 4 in peer mode, by Client 3 6 in CC mode, and by Client 1 2 in both modes. In the example, Service b 12 is the coordinator of Group B 52 when it is in CC mode. Each client 2, 4, 6 is provided with the appropriate group proxy 42, 44 so that it can call Group B 52 in the desired manner. The look-up service 20 has registered a peer group proxy 42 and a CC group proxy 44 for Group B 52. It is therefore necessary that clients that query the look-up service 20 not only be able to find a Group B proxy, but that the lookup service be able to provide clients with a description of the group proxy's structure (peer or CC).

In the embodiment as shown the grouping agent 12b, 14b, 16b for each service 12, 14, 16 detects whether a command is being sent to the group 52 as a CC or peer group, and coordinates with the other grouping agents to appropriately update the states of each of the services. While it may be desirable for the services to handle multitasking in order to effectively switch states, this is no different from any service that can be called asynchronously by two different clients. Alternatively, the burden of multitasking between various states can be put onto the grouping agents 12, 14, 16. While in FIG. 9, a single grouping agent 12b, 14b, 16b is shown for each service 12, 14, 16, in an alternative embodiment each service could have a peer grouping agent and a CC grouping agent.

An interesting aspect of the distributed computing system shown in FIG. 9 is that Client 1 2 can call Group B 52 in either CC or peer mode, depending on which group proxy it uses. The client may be executing two processes, one of which uses Group B in peer mode and the other uses it in CC mode. Alternatively, the client may be group-aware and decide based on certain criteria (reliability, cost, time of day) to execute certain commands in one mode, and certain commands in another mode.

It is understood that the invention is not limited to the disclosed embodiments, but on the contrary, is intended to cover various modifications and equivalent arrangements included within the spirit and scope of the appended claims. Without further elaboration, the foregoing will so fully illustrate the invention, that others may by current or future knowledge, readily adapt the same for use under the various conditions of service.

What is claimed is:

1. A computer-implemented method of handling a transition in a group of services in distributed computing application comprising the steps of:

determining the n ed for the transition;

determining a correct group logic shell and service proxies for the transition group; and dynamically updating a group proxy, said group proxy being associated with a client that calls the group, so that the group proxy contains the correct determined group logic shell and service proxies.

2. The method of claim 1 wherein the transition a fail-over from one service to another service within the group, addition of a new service to the group, the removal of a service from the group, or a change in group mode.

3. The method of claim 1 wherein there are a plurality of clients that call the group, each client having its own instance of the group proxy associated with it, and the updating step of claim 1 is performed for the group proxy of each client that calls the transitioning group.

4. The method of claim 1 wherein the step of updating the group proxy is further comprised of adding at least one service proxy, deleting at least one service proxy, swapping a group logic shell, or reconfiguring the group logic shell for a new group mode.

5. The method of claim 1 wherein the group is a peer group or a coordinator cohort group.

6. The method of claim 1 further comprising the steps of:
   deregistering the group from a lookup service; and
   after the transition is complete, registering the group, along with the updated group proxy, with the lookup service.

7. A computer readable medium containing instructions for controlling a computer system to perform a method of handling a transition in a group of services in a distributed computing application comprising the steps of:
   determining the need for the transition;
   determining a correct group logic shell and service proxies for the transition group; and
   dynamically updating a group proxy, said group proxy being associated with a client that calls the group, so that the group proxy contains the correct determined group logic shell and service proxies.

8. The computer readable medium of claim 7 wherein the transition is a fail-over from one service to another service within the group, the addition of a new service to the group, the removal of a service from the group, or a change in group mode.

9. The computer readable medium of claim 7 wherein there are a plurality of clients that call the group, each client having its own instance of the group proxy associated with it, and the updating step of claim 7 is performed for the group proxy of each client that calls the transitioning group.

10. The computer readable medium of claim 7 wherein the step of updating the group proxy is further comprised of adding at least one service proxy, deleting at least one service proxy, swapping a group logic shell, or reconfiguring the group logic shell for a new group mode.

11. The computer readable medium of claim 7 wherein the group is a peer group or a coordinator cohort group.

12. The computer readable medium of claim 7 wherein the method is further comprised of the steps of:
   deregistering the group from a lookup service; and
   after the transition is complete, registering the group, along with the updated group proxy, with the lookup service.

* * * * *